United States Patent
Kazuyoshi

(10) Patent No.: US 7,381,505 B2
(45) Date of Patent: Jun. 3, 2008

(54) COLOR FILTER SUBSTRATE FOR LIQUID CRYSTAL DISPLAY DEVICE AND METHOD FOR MANUFACTURING THE SAME

(75) Inventor: Nagayama Kazuyoshi, Yokohama (JP)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 11/603,246

(22) Filed: Nov. 22, 2006

(65) Prior Publication Data
US 2007/0115405 A1    May 24, 2007

(30) Foreign Application Priority Data
Nov. 22, 2005   (JP)   ............................. 2005-336952

(51) Int. Cl.
G02F 1/1335   (2006.01)

(52) U.S. Cl. .......................................... 430/7; 349/106

(58) Field of Classification Search ...................... None
See application file for complete search history.

(56) References Cited

U.S. PATENT DOCUMENTS

2004/0004683 A1*   1/2004   Kaneda et al. ............... 349/106
2007/0008462 A1*   1/2007   Yang et al. .................. 349/106

* cited by examiner

Primary Examiner—John A. McPherson
(74) Attorney, Agent, or Firm—McKenna & Long & Aldridge LLP

(57) ABSTRACT

A color filter substrate for a liquid crystal display device includes sub-pixel regions of three primary colors of R, G, and B formed by colored layers of the three primary colors, and sub-pixel regions of complementary colors of the three primary colors, namely, C, M, and Y, each formed by arranging two of the colored layers of the three primary colors such that the two colored layers are adjacent to each other. The colored layer thickness in each complementary-color sub-pixel region is larger than the colored layer thickness in each primary-color sub-pixel region. To compensate for the thickness difference, a transparent resin layer having no influence on the transmittance of light is formed such that the surfaces of the colored layers contacting a liquid crystal layer are leveled.

4 Claims, 10 Drawing Sheets

1/2 B  1/2 G    1画素 B
C画素          B画素

COLOR FILTER SUBSTRATE FOR LIQUID CRYSTAL DISPLAY DEVICE AND METHOD FOR MANUFACTURING THE SAME

This application claims the benefit of the Japanese Patent Application No. JP2005-336952, filed on Nov. 22, 2005, which is hereby incorporated by reference as if fully set forth herein.

BACKGROUND OF THE INVENTION

1. Field of the Invention

The present invention relates to a color filter substrate for a liquid crystal display (LCD) device capable of achieving high color purity, and a method for manufacturing the same.

2. Discussion of the Related Art

Recently, in flat panel display (FPD) fields, research related to a liquid crystal display (LCD), a plasma display panel (PDP), a field emission display (FED), a vacuum fluorescent display (VFD), etc. has been actively made.

Currently, the LCD is being highlighted by virtue of mass production techniques, ease in driving, and high picture quality. The LCD is a device for displaying information on a screen using the refractive index anisotropy of liquid crystal.

The following are two examples of related art techniques for color display of a superior color purity.

The first related art technique is a color filter used in a reflection type LCD. This color filter includes a first layer and a second layer. The first layer has three regions respectively including color patterns of 3 complementary colors, namely, yellow (Y), magenta (M), and cyan (C). The second layer has three regions respectively including color patterns of the 3 complementary colors and partionally overlapping with the first layer. Accordingly, color patterns of 3 primary colors, namely, red (R), green (G), and blue (B) are formed by overlapping two of the color patterns of the 3 complementary colors with each other. Thus, this technique can display colors with a superior color purity, using the 6 colors. An example of this technique is disclosed, for example, in Japanese Patent Laid-open Publication No. Heisei 10-307205.

The second related art technique is a display in an LCD in which a full-color display is accomplished using a guest-host mode. This display includes first colored regions respectively displaying 3 primary colors of R, G, and B, and second colored regions respectively displaying 3 complementary colors of C, M, and Y. Each second colored region overlaps with the first colored regions of the primary colors corresponding to the complementary color. Thus, this technique can display colors with a superior color purity. An example of this technique is disclosed, for example, in Japanese Patent Laid-open Publication No. 2005-107227.

The two related art techniques achieve color display of 6 or more colors by using 3 colors for basic colors, and combining two of the colored layers of the 3 colors such that the two colored layers are overlapped with each other.

However, where colored layers of two colors are overlapped with each other in a display direction in an LCD, as in the above-mentioned related art techniques, the light emitted in the display direction exhibits a reduced transmittance, as compared to light transmit a single layer of a single color. This is because two spectrums of incident light, which correspond to the transmitted two colors, are absorbed.

SUMMARY OF THE INVENTION

Accordingly, the present invention is directed to a color filter substrate for a liquid crystal display device and a method for manufacturing the same that substantially obviate one or more problems due to limitations and disadvantages of the related art.

An advantage of the present invention is to provide a color filter substrate for a liquid crystal display device and a method for manufacturing the same, which are capable of achieving a high color purity in patterns of 6 colors for a liquid crystal color display, and achieving inexpensive manufacture.

Additional advantages and features of the invention will be set forth in part in the description which follows and in part will become apparent from the description, or may be learned from practice of the invention. These and other advantages of the invention will be realized and attained by the structure particularly pointed out in the written description and claims hereof as well as the appended drawings.

To achieve these and other advantages and in accordance with the purpose of the invention, as embodied and broadly described herein, a color filter substrate for a liquid crystal display device comprises: a transparent insulating substrate; and a single-layer color filter layer formed on the transparent insulating substrate, the color filter layer having at least six color patterns, wherein the color filter layer comprises color pattern portions of three primary colors of red, green, and blue, and three color pattern portions of complementary colors of the three primary colors, each complementary color being formed by arranging at least two of the color patterns of the three primary colors such that the at least two color patterns are adjacent to each other, and wherein the color filter layer has different thicknesses at each of the color pattern portions of the three primary colors and at each of the color pattern portions of the complementary colors, respectively.

In another aspect of the present invention, a method for manufacturing a color filter substrate for a liquid crystal display device comprises: providing a transparent resin on a transparent insulating substrate, and partially removing the provided transparent resin by a mask exposure to form a transparent resin layer; providing a red coloring agent over the transparent insulating substrate, and partially removing the provided red coloring agent by a mask exposure to form a red color filter layer; providing a green coloring agent over the transparent insulating substrate, and partially removing the provided green coloring agent by a mask exposure to form a green color filter layer; and providing a blue coloring agent over the transparent insulating substrate, and partially removing the provided blue coloring agent by a mask exposure to form a blue color filter layer, wherein each of the color filter layers of red, green, and blue is formed on a portion of the transparent insulating substrate on which the transparent resin layer is formed such that the color filter layer overlaps the transparent resin layer, and each of the color filter layers of red, green, and blue is formed on a portion of the transparent insulating substrate other than the transparent insulating substrate portion on which the transparent resin layer is formed, such that the color filter layer is arranged adjacent to another one of the color filter layers of red, green, and blue.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and along with the description serve to explain the principle of the invention. In the drawings.

DETAILED DESCRIPTION OF THE ILLUSTRATED EMBODIMENTS

Reference will now be made in detail to embodiments of the present invention, examples of which are illustrated in the accompanying drawings.

Figure 1:
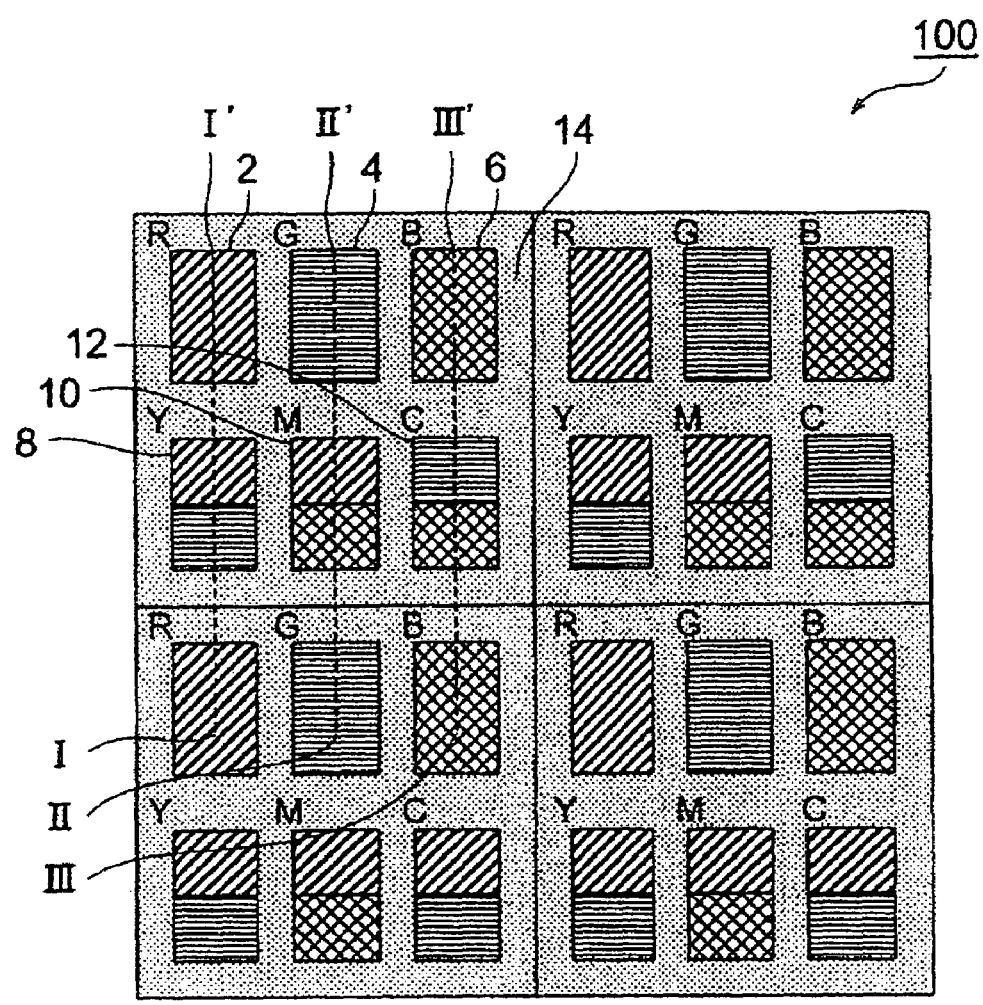
FIG. 1 illustrates a plan view of a color filter substrate for an LCD according to an embodiment of the present invention.

FIG. 1 schematically illustrates the overall structure of a color filter substrate according to an embodiment of the present invention.

As shown in FIG. 1, the color filter substrate 100 includes a plurality of pixels regularly arranged in the form of a matrix. Each pixel includes sub-pixel regions of 6 colors.

Specifically, each pixel includes 6 sub-pixel regions, namely, a red (R) pixel region 2, a green (G) pixel region 4, a blue (B) pixel region 6, a yellow (Y) pixel region 8, a magenta (M) pixel region 10, and a cyan (C) pixel region 12.

In this embodiment, the Y pixel region 8 is formed by a combination of a color filter for the R pixel region 2 and a color filter for the G pixel region 4. The M pixel region 10 is formed by a combination of the color filter for the R pixel region 2 and a color filter for the B pixel region 6. The C pixel region 12 is formed by a combination of the color filter for the G pixel region 4 and the color filter for the B pixel region 6.

Also, the combination ratios of the color filter for the R pixel region 2, the color filter for the G pixel region 4, and the color filter for the B pixel region 6 for formation of respective sub-pixels of the Y pixel region 8, M pixel region 10, and C pixel region 12 may be determined in a designing stage in accordance with the color reproducibility of the display screen.

The 6-color sub-pixel regions may be arranged in the form of patterns as shown in FIG. 1. However, other arrangement patterns such as mosaic (diagonal) patterns or delta (triangle) patterns may be applicable.

Hereinafter, the cross-sectional structures of the six sub-pixel regions 2, 4, 6, 8, 10, and 12 shown in FIG. 1 will be described with reference to FIGS. 2A to 2C.

Figure 2A:
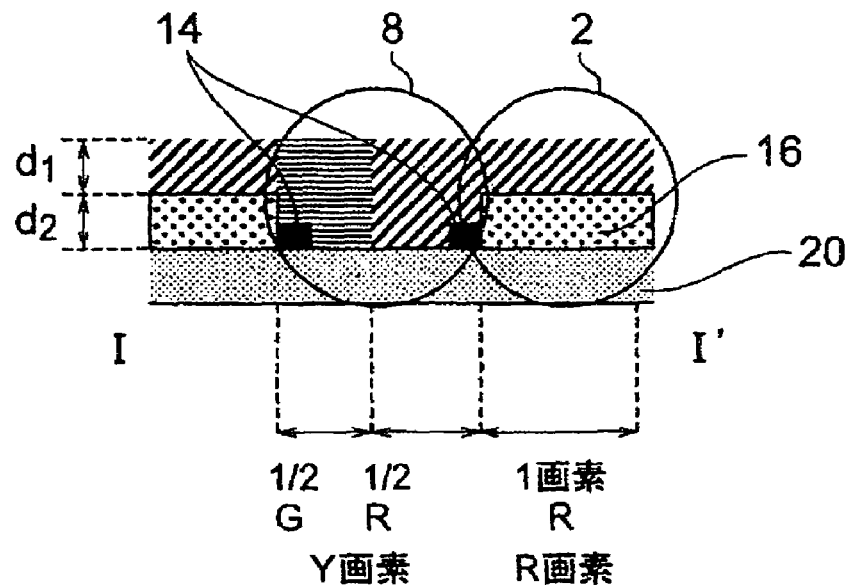
FIGS. 2A to 2C illustrate cross-sectional views taken along the lines I-I', II-II', and III-III', respectively, shown in FIG. 1.
Figure 2B:
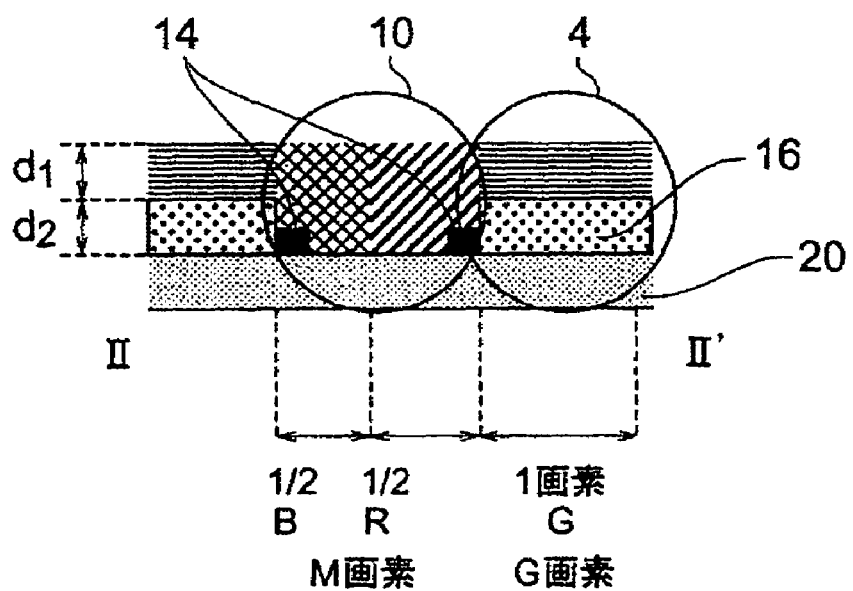
Figure 2C:
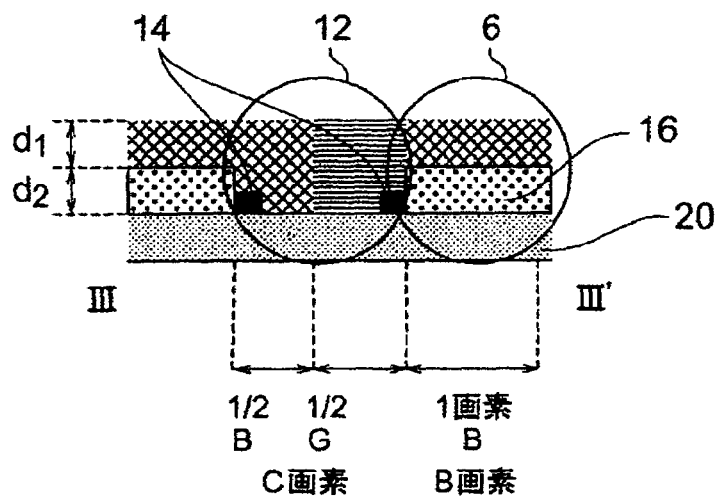

In FIGS. 2A to 2C, the color filter substrate 100 has a cross-sectional structure including a transparent insulating substrate 20 made of a transparent insulating material such as glass, a transparent resin layer 16 made of a transparent material such as acrylic resin having no influence on transmittance, colored layers (color filter layers) of 3 colors, namely, red (R), green (G), and blue (B), and a black matrix 14 for shielding incident light through gaps among the colored layers.

The cross-sectional structures respectively shown in FIGS. 2A to 2C will now be described in detail.

FIG. 2A illustrates a cross-sectional view taken along the line I-I' of FIG. 1. FIG. 2A illustrates the structures of the R pixel region 2 and Y pixel region 8.

As shown in FIG. 2A, the cross-sectional structure of the R pixel region 2 is formed by overlapping the transparent resin layer 16 and the colored layer of red (R) The cross-sectional structure of the Y pixel region 8 is formed by arranging the colored layer of green (G) and the colored layer of red (R) such that they are adjacent to each other.

The Y pixel region 8, which is formed by the combination of the above two colored layers, corresponds to one sub pixel region, similarly to the R pixel region 2. In the Y pixel region 8, however, the combination ratio between the colored layer of red (R) and the colored layer of green (G) is 1:1.

When the colored layer of red (R) in the R pixel region 2 has a thickness of $d_1$, and the transparent resin layer in the R pixel region 2 has a thickness of $d_2$, both the colored layers of red (R) and green (G) in the Y pixel region 8 have a thickness of "$d_1+d_2$". That is, the colored layers of the Y pixel region 8 are thicker than the colored layer of the R pixel region 2 by the thickness of the transparent resin layer 16.

In this embodiment, although the colored layer thickness of the R pixel region 2 and the colored layer thickness of the Y pixel region 8 are different from each other, the boundary between the R pixel region 2 and the Y pixel region 8 has a leveled flat surface as the thickness difference is eliminated by the provision of the transparent resin layer 16. Accordingly, there is no occurrence of retardation causing display luminance unevenness.

FIG. 2B illustrates a cross-sectional view taken along the line II-II' of FIG. 1. FIG. 2B illustrates the structures of the G pixel region 4 and M pixel region 10.

As shown in FIG. 2B, the G pixel region 4 is formed by overlapping the transparent resin layer 16 and the colored layer of green (G). The M pixel region 10 is formed by arranging the colored layer of blue (B) and the colored layer of red (R) such that they are adjacent to each other.

That is, the arrangement of FIG. 2B is identical to the arrangement of FIG. 2A in terms of cross-sectional structures, except for the color provided in each colored layer. Accordingly, no detailed description of the cross-sectional structures of the G pixel region 4 and M pixel region 10 will be given.

FIG. 2C illustrates a cross-sectional view taken along the line III-III' of FIG. 1. FIG. 2C illustrates the structures of the B pixel region 6 and C pixel region 12.

As shown in FIG. 2C, the B pixel region 6 is formed by overlapping the transparent resin layer 16 and the colored layer of blue (B). The C pixel region 12 is formed by arranging the colored layer of blue (B) and the colored layer of green (G) such that they are adjacent to each other.

Similar to the arrangement of FIG. 2B, the arrangement of FIG. 2C is identical to the arrangement of FIGS. 2A and 2B in terms of cross-sectional structures, except for the color of each colored layer. Accordingly, no detailed description of the cross-sectional structures of the B pixel region 6 and C pixel region 12 will be given.

Hereinafter, the color purity exhibited in accordance with results of a simulation carried out for the display screen in the LCD device including the color filter substrate 100 according to this embodiment will be described in detail with reference to FIG. 3.

Figure 3:
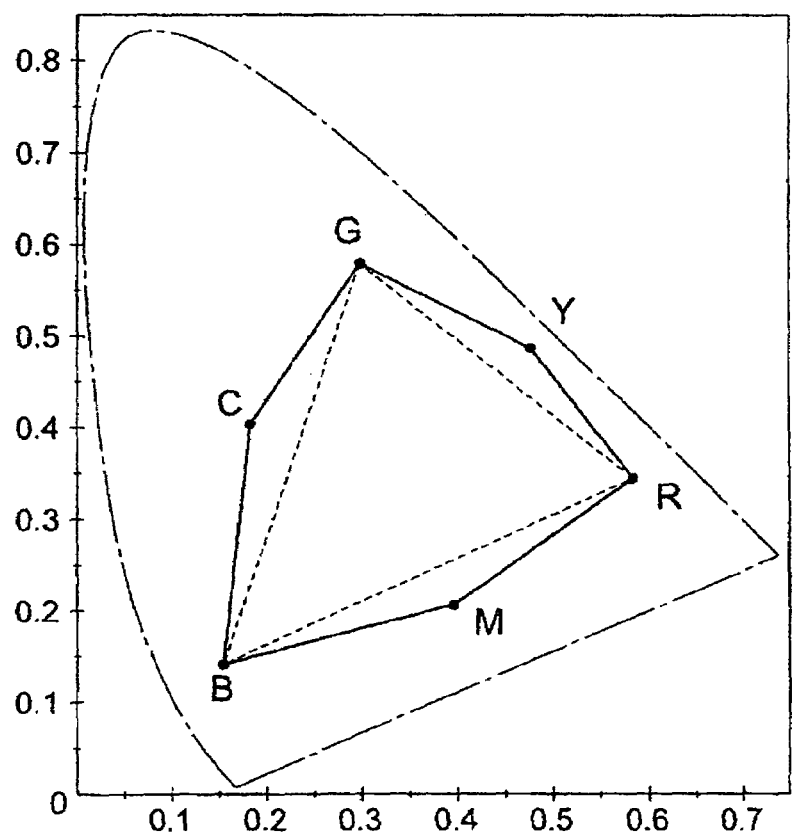
FIG. 3 illustrates an xy chromaticity diagram for explaining a color purity on a display screen in an LCD including an LCD color filter according to the present invention.

FIG. 3 illustrates an xy chromaticity diagram depicting results of a simulation carried out for the LCD device using the color filter substrate 100. In the simulation for the LCD device, a fluorescent lamp, which is a general 3-wavelength tube typically used, was used as a backlight. Even in the case where an LED is used, which exhibits low power consumption and more flexible wavelength adjustment for output light, as compared to the fluorescent lamp, the same results are obtained.

In the xy chromaticity diagram of FIG. 3, the triangle drawn by a broken line connecting three points R, G, and B represent the chromaticities of the three primary colors, namely, R, G, and B. The horseshoe-shaped area drawn along the outer circumference of the triangle represents the boundary of a visible range prescribed by the Commission International d'Eclairage (CIE). The xy chromaticity diagram shows that the saturation (color purity) is gradually reduced toward the inside of the horseshoe-shaped area.

When a color is realized in accordance with an additive mixture of the three primary colors of red (R), green (G), and blue (B), it is possible to reproduce only the color gamut defined by a polygon having vertexes corresponding to points represented by a plurality of reference colors on the xy chromaticity diagram.

For example, where the colored layers forming the red (R), green (G), and blue (B) sub-pixel regions 2, 4, and 6 have the same thickness as the colored layers of the yellow (Y), magenta (M), and cyan (C) pixel regions 8, 10, and 12 respectively formed by combinations of colored layers of three primary colors, differently from the cross-sectional structures according to the above-described embodiment, the color gamut displayable using a fluorescent lamp or the like, as typically used, is within a range defined by the triangle RGB on the xy chromaticity diagram.

On the other hand, in the case of the cross-sectional structures according to this embodiment, the color gamut displayable using a fluorescent lamp or the like, as typically used, is within a range defined by the hexagon RYGCBM on the xy chromaticity diagram. That is, high color purity is achieved on an LCD display screen by forming the colored layers of the yellow (Y), magenta (M), and cyan (C) pixel regions 8, 10, and 12 such that they are thicker than the colored layers of the red (R), green (G), and blue (B) sub-pixel regions 2, 4, and 6.

This shows that it is possible to more definitely display the color patterns of sub-pixel regions, and to enhance the color purity of the displayable color gamut by virtue of the thicker portions of the colored layers of the yellow (Y), magenta (M), and cyan (C) pixel regions 8, 10, and 12 than those of the related art.

Hereinafter, a method for manufacturing the color filter substrate 100 according to this embodiment illustrated in FIGS. 1 and 2 will be described in detail with reference to FIGS. 4A to 10C.

Figure 4A:
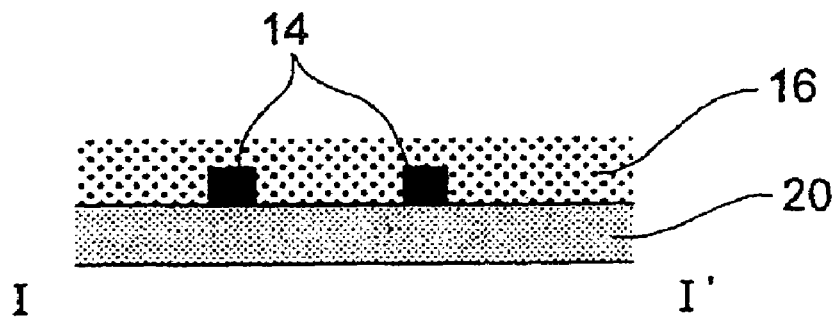
FIGS. 4A to 4C illustrate cross-sectional views of a method for manufacturing the color filter substrate shown in FIGS. 1 and 2.
Figure 4B:
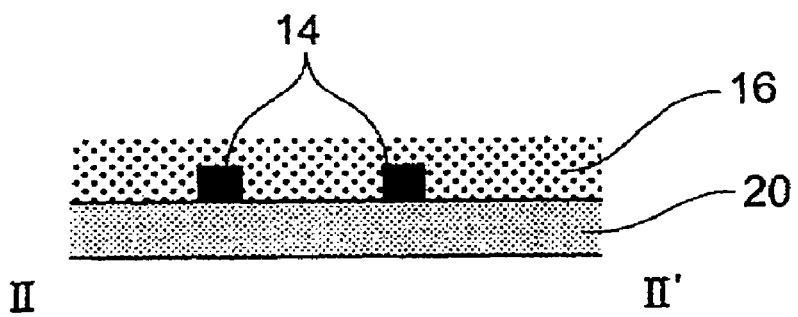
Figure 4C:
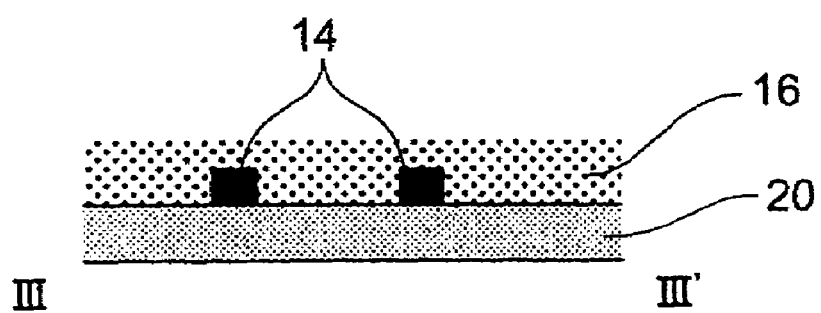

FIGS. 4A to 4C illustrate cross-sectional views corresponding to cross-sections taken along the lines I-I', II-II', and III-III' of FIG. 1, respectively, and illustrate a first processing step in the manufacturing method for the color filter substrate 100.

In the first processing step, a black matrix (hereinafter, referred to as a "BM") 14 is formed on a transparent insulating substrate 20 made of, for example, glass, at boundaries among R, G, B sub-pixel regions 2, 4, and 6, and C, M, and Y sub-pixel regions 8, 10, and 12. Thereafter, a transparent resin layer 16 is formed on the transparent insulating substrate 20.

For the material of the BM 14, chromium may be used, as in the related art. Or, chromium oxide (CrOx) or resin BM may be used for the purpose of a reduction in surface reflection.

The formation of the BM 14 may be carried out using a photolithography (PEP) process, as in the related art.

For the material of the transparent resin layer 16, a transparent resin such as acrylic resin may be used. As shown in FIGS. 4A to 4C, the transparent resin layer 16 is formed on the entire upper surface of the transparent insulating substrate 20.

Figure 5A:
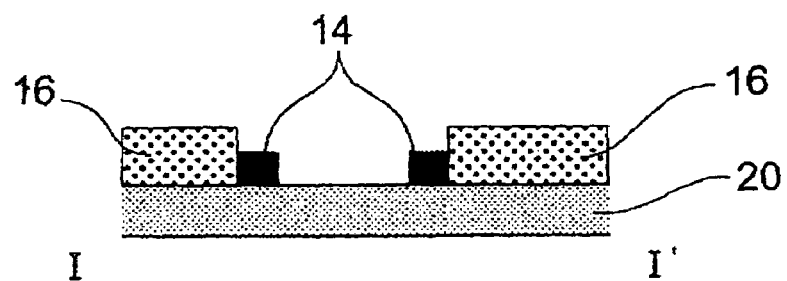
FIGS. 5A to 5C illustrate cross-sectional views of the method for manufacturing the color filter substrate shown in FIGS. 1 and 2.
Figure 5B:
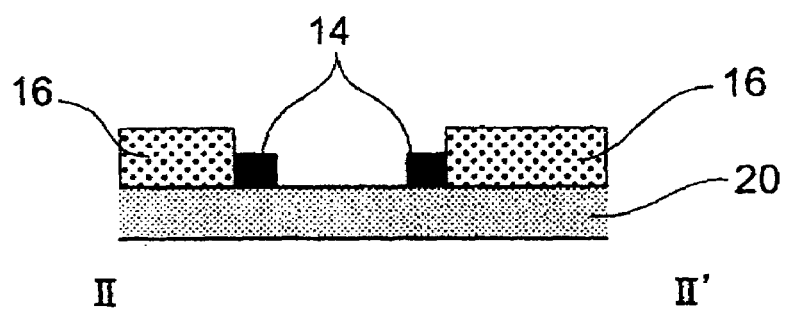
Figure 5C:
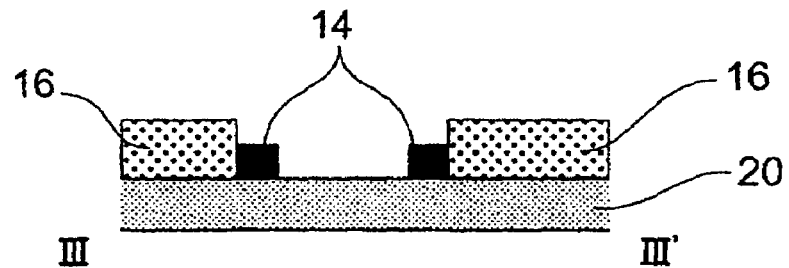

Next, FIGS. 5A to 5C illustrates cross-sectional views corresponding to cross-sections taken along the lines I-I', II-II', and III-III' of FIG. 1, respectively, and illustrate a second processing step in the manufacturing method for the color filter substrate 100.

In the second processing step, unnecessary portions of the transparent resin layer 16 formed on the transparent insulating substrate 20 in the above-described first processing step are removed in accordance with a PEP process.

In this embodiment, it is preferred that the transparent resin layer 16 remain only in the R, G, and B sub-pixel regions 2, 4, and 6, in order to achieve leveling of the surfaces of the colored layers forming the R, G, and B sub-pixel regions 2, 4, and 6 and the surfaces of the colored layers forming the C, M, and Y sub-pixel regions 8, 10, and 12. That is, it is preferred that the portions of the transparent resin layer 16 respectively corresponding to the C, M, and Y sub-pixel regions 8, 10, and 12 be removed as unnecessary portions. In accordance with the removal of the unnecessary portions, the necessary portions of the transparent resin layer 16 correspond to the R, G, and B sub-pixel regions 2, 4, and 6, respectively, as shown in FIGS. 5A to 5C.

Figure 6A:
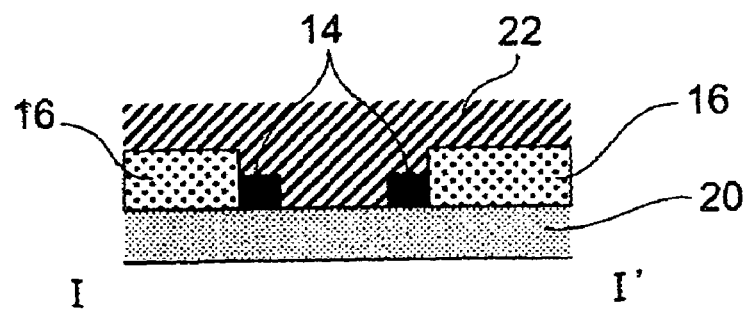
FIGS. 6A to 6C illustrate cross-sectional views of the method for manufacturing the color filter substrate shown in FIGS. 1 and 2.
Figure 6B:
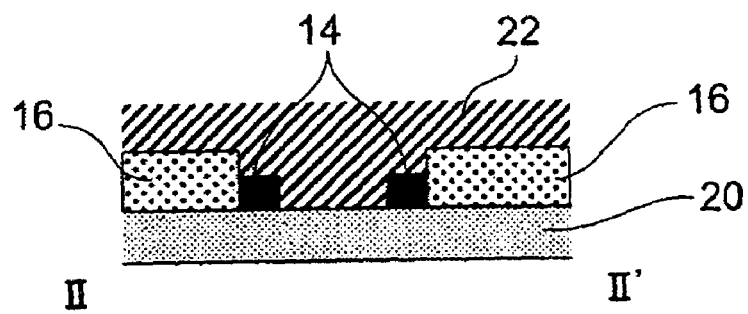
Figure 6C:
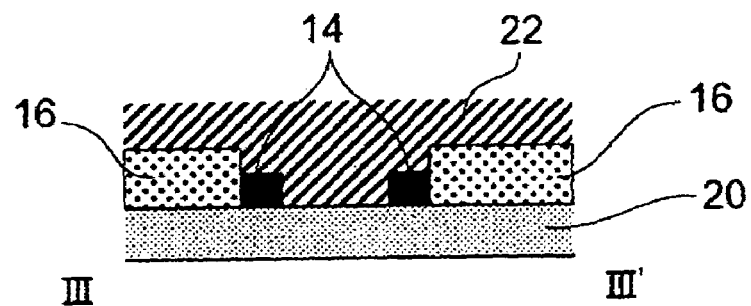

Next, FIGS. 6A to 6C illustrate cross-sectional views corresponding to cross-sections taken along the lines I-I', II-II', and III-III' of FIG. 1, respectively, and illustrating a third processing step in the manufacturing method for the color filter substrate 100.

In the third processing step, a red (R) colored layer 22 is formed on the entire upper surface of the transparent insulating substrate 20, as shown in FIGS. 6A to 6C. In this case, the red (R) colored layer 22 is formed to have a leveled surface. The dye or pigment (coloring agent) used for the R colored layer 22 is the same as those used in the related art.

Figure 7A:
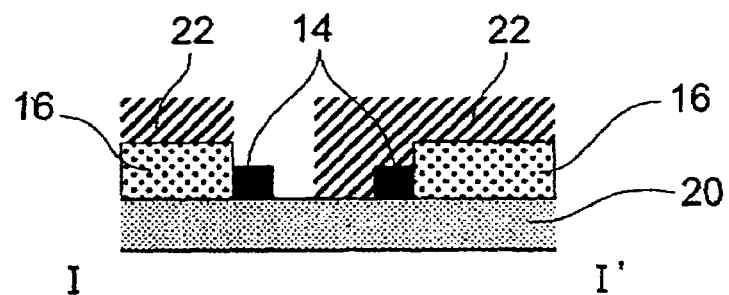
FIGS. 7A to 7C illustrate cross-sectional views of the method for manufacturing the color filter substrate shown in FIGS. 1 and 2.
Figure 7B:
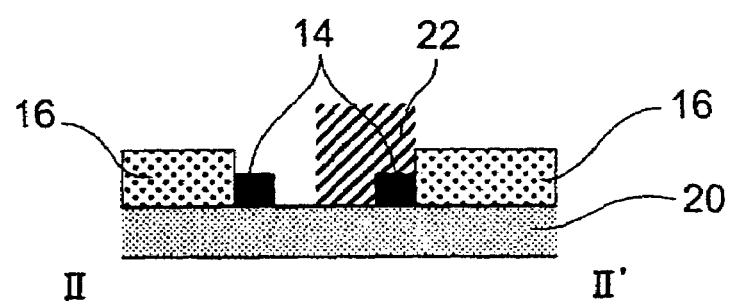
Figure 7C:
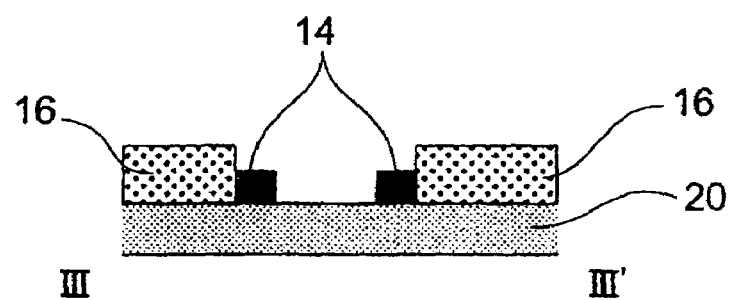

Next, FIGS. 7A to 7C illustrate cross-sectional views corresponding to cross-sections taken along the lines I-I', II-II', and III-III' of FIG. 1, respectively, and illustrating a fourth processing step in the manufacturing method for the color filter substrate 100.

In the fourth processing step, unnecessary portions of the R colored layer 22 formed on the transparent insulating substrate 20 in the third processing step are removed using a PEP process.

FIG. 7A illustrates a cross-sectional view corresponding to FIG. 2A. As shown in FIG. 7A, the R colored layer 22 remains in the pixel region 2 and in a half portion of the Y pixel region 8, while being removed from the remaining half portion of the Y pixel region 8.

FIG. 7B illustrates a cross-sectional view corresponding to FIG. 2B. As shown in FIG. 7B, the R colored layer 22 remains in a half portion of the M pixel region 10, while being removed from the remaining half portion of the M pixel region 10.

FIG. 7C illustrates a cross-sectional view corresponding to FIG. 2C. As shown in FIG. 7C, the R colored layer 22 is completely removed from the B pixel region 6 and C pixel region 12 because the R colored layer 22 is unnecessary in the B pixel region 6 and C pixel region 12.

Figure 8A:
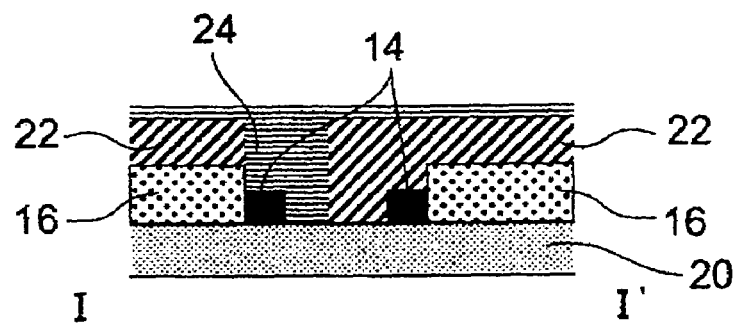
FIGS. 8A to 8C illustrate cross-sectional views of the method for manufacturing the color filter substrate shown in FIGS. 1 and 2.
Figure 8B:
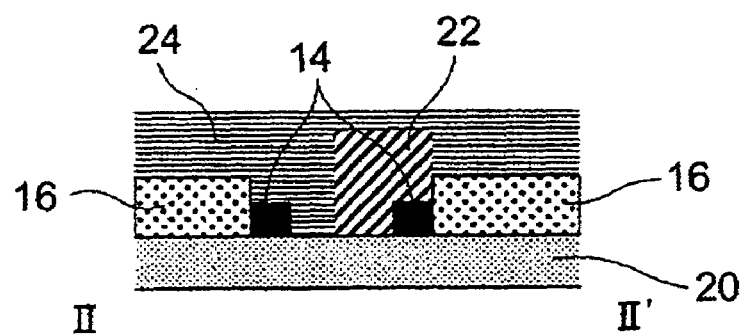
Figure 8C:
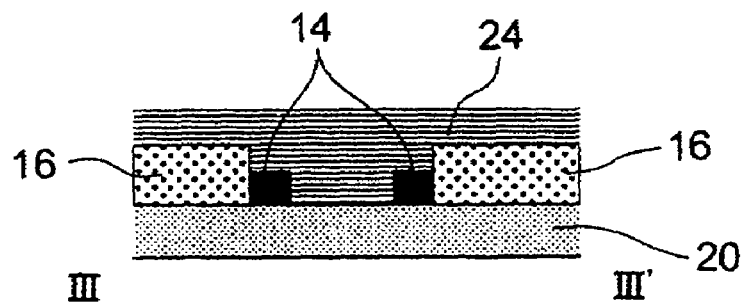

Next, FIGS. 8A to 8C illustrate cross-sectional views corresponding to cross-sections taken along the lines I-I', II-II', and III-III' of FIG. 1, respectively, and illustrating a fifth processing step in the manufacturing method for the color filter substrate 100.

In the fifth processing step, a green (G) colored layer 24 is formed on the entire upper surface of the transparent insulating substrate 20 in a completed state of the above-described fourth processing step, as shown in FIGS. 8A to 8C. In this case, the green (G) colored layer 24 formed to have a leveled surface. The dye or pigment (coloring agent) used for the G colored layer 24 is the same as those used in the related art.

Figure 9A:
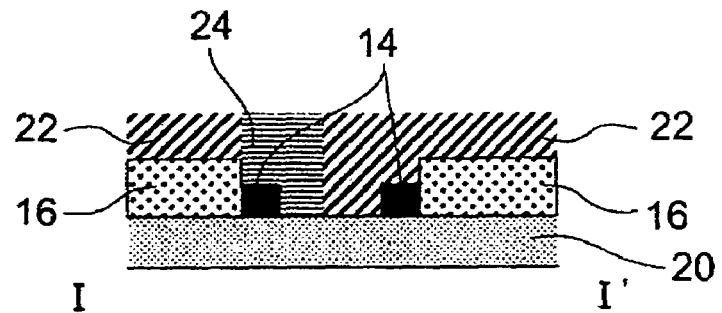
FIGS. 9A to 9C illustrate cross-sectional views of the method for manufacturing the color filter substrate shown in FIGS. 1 and 2.
Figure 9B:
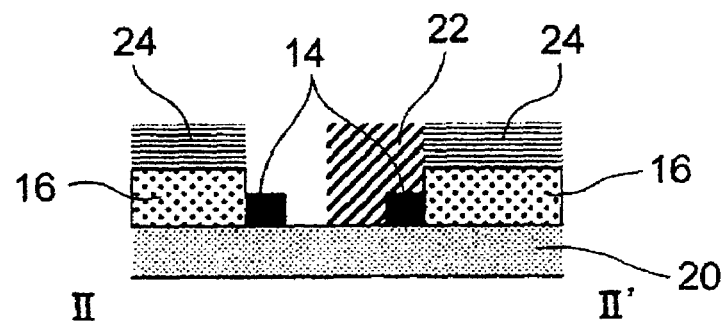
Figure 9C:
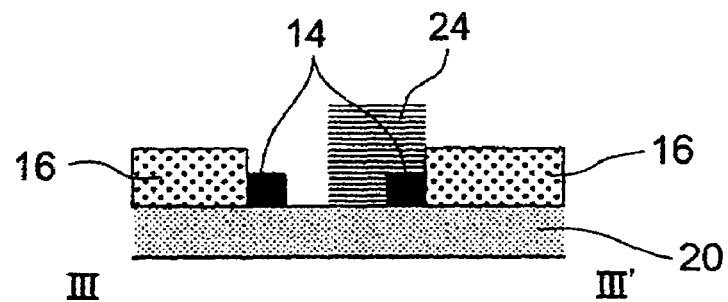

Next, FIGS. 9A to 9C illustrate cross-sectional views corresponding to lines I-I', II-II', and III-III' of FIG. 1, respectively, and illustrate a sixth processing step in the manufacturing method for the color filter substrate 100.

In the sixth processing step, unnecessary portions of the G colored layer 24 formed on the transparent insulating substrate 20 in the fifth processing step are removed using a PEP process.

FIG. 9A illustrates a cross-sectional view corresponding to FIG. 2A. As shown in FIG. 9A, the G colored layer 24 remains in a half portion of the Y pixel region 8, while being removed from the remaining half portion of the Y pixel region 8.

FIG. 9B illustrates a cross-sectional view corresponding to FIG. 2B. As shown in FIG. 9B, the G colored layer 24 remains in the G pixel region 4, while being removed from the M pixel region 10.

FIG. 9C illustrates a cross-sectional view corresponding to FIG. 2C. As shown in FIG. 9C, the G colored layer 24 remains in a half portion of the C pixel region 12, while being removed from the remaining half portion of the C pixel region 12.

Figure 10A:
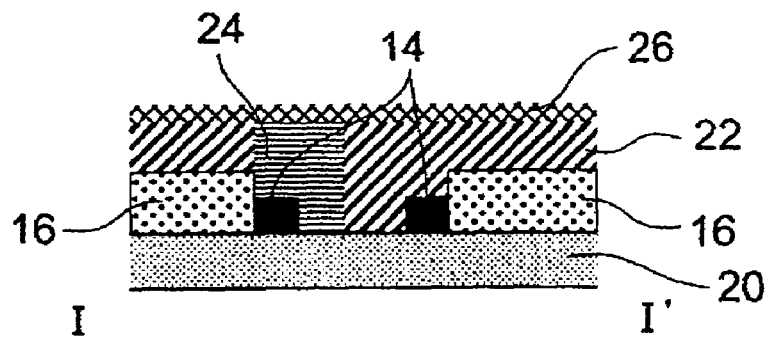
FIGS. 10A to 10C illustrate cross-sectional views of the method for manufacturing the color filter substrate shown in FIGS. 1 and 2.
Figure 10B:
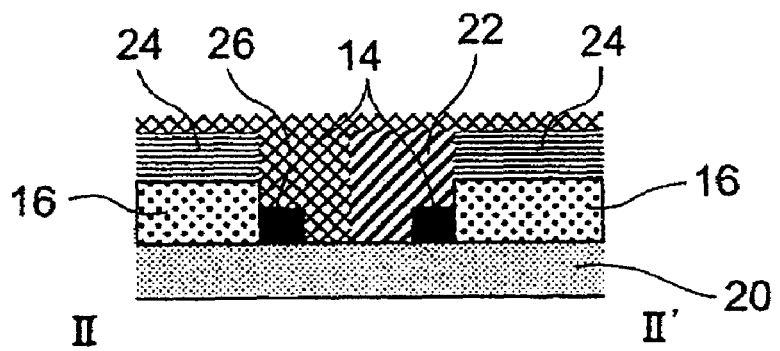
Figure 10C:
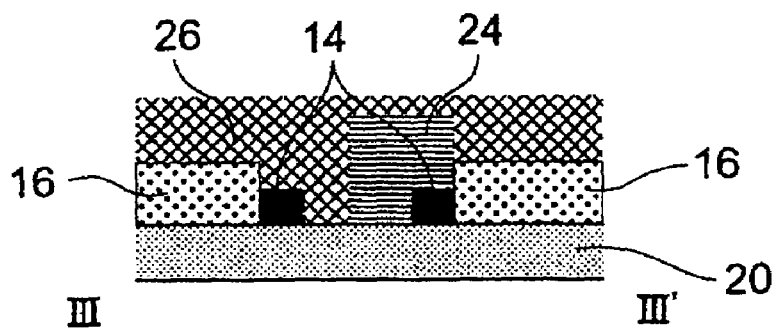

Next, FIGS. 10A to 10C illustrate cross-sectional views corresponding to the lines I-I', II-II', and III-III' of FIG. 1, respectively, and illustrate a seventh processing step in the manufacturing method for the color filter substrate 100.

In the seventh processing step including FIGS. 10A-10C, a blue (B) colored layer 26 is formed on the entire upper surface of the transparent insulating substrate 20 in a completed state of the above-described sixth processing step. 10A to 10C. In this step, the blue (B) colored layer 26 has a leveled surface. The dye or pigment (coloring agent) used for the B colored layer 26 is the same as those used in the related art.

Finally, unnecessary portions of the B colored layer 26 formed on the transparent insulating substrate 20 in the seventh processing step are removed using a PEP process, as shown in FIGS. 10A to 10C.

Specially, the B colored layer 26 shown in FIG. 10A is completely removed from the R pixel region 2 and Y pixel region 8.

The B colored layer 26 shown in FIG. 10B remains in a half portion of the M pixel region 10, while being removed from the G pixel region 4 and from the remaining half portion of the M pixel region 10.

The B colored layer 26 shown in FIG. 10C remains in the B pixel region 6 and in a half portion of the C pixel region 12, while being removed from the remaining portion of the C pixel region 12.

As the above-described processing steps are carried out, the cross-sectional structure shown in FIG. 2 is completed.

Although the manufacturing method has been described as including the first to seventh processing steps in this embodiment, an alternate manufacturing method may be carried out in which the processing steps for forming the transparent resin layer 16, R colored layer 22, G colored layer 24, and B colored layer 26 are changed in accordance with various order patterns, except for the formation of the BM 14 in the first processing step.

As apparent from the above description, in accordance with this embodiment, it is possible to achieve high color purity using a six-color pattern for a liquid crystal color display without a reduction in the transmittance of the panel by leveling the surfaces of the colored layers of 3-primary colors, namely, R, G, and B, contacting a liquid crystal layer by the transparent resin layer 16 having no influence on light transmittance, in order to compensate for the thickness difference between the colored layers in the R, G, and B sub-pixel regions 2, 4, and 6 and the colored layers in the complementary-color sub-pixel regions displaying complementary colors of the three primary colors in accordance with the arrangement of the colored layers corresponding to two of the 3-primary colors in which the colored layers are arranged adjacent to each other.

Also, it is possible to manufacture the above-described panel using related art colored layers of the three primary colors.

The present invention provides a color filter substrate for an LCD device and a method for manufacturing the same which are capable of achieving a high color purity in patterns of 6 colors for a liquid crystal color display, and achieving inexpensive manufacture by forming a single-layer color filter layer having color patterns of at least six colors such that it includes color pattern portions of three primary colors, namely, red, green, and blue, and color pattern portions of complementary colors of the three primary colors each formed by arranging at least two of the primary-color pattern portions such that the two primary-color pattern portions are adjacent to each other, the color filter layer having a larger thickness at the complementary-color pattern portions than at the primary-color pattern portions.

The present invention also provides a color filter substrate for an LCD device and a method for manufacturing the same which are capable of achieving a high color purity in patterns of six colors for a liquid crystal color display, without a reduction in the transmittance of the panel by forming a transparent resin layer such that it overlaps with the color pattern portions of the three primary colors, and leveling the surfaces of the color pattern portions contacting a liquid crystal layer by the transparent resin layer.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A color filter substrate for a liquid crystal display device comprising:
   a transparent insulating substrate; and
   a single-layer color filter layer formed on the transparent insulating substrate, the color filter layer having at least six color patterns,
   wherein the color filter layer comprises color pattern portions of three primary colors of red, green, and blue, and three color pattern portions of complementary colors of the three primary colors, each complementary color being formed by arranging at least two of the color patterns of the three primary colors such that the at least two color patterns are adjacent to each other, and
   wherein the color filter layer has different thicknesses at each of the color pattern portions of the three primary colors and at each of the color pattern portions of the complementary colors, respectively.

2. The color filter substrate according to claim 1, wherein the thickness of the color filter layer at each of the color pattern portions of the complementary colors is larger than the thickness of the color filter layer at each of the color pattern portions of the primary colors.

3. The color filter substrate according to claim 1, further comprising:
   a transparent resin layer formed on the transparent insulating substrate such that the transparent resin layer overlaps the color filter layer at each of the color pattern portions of the three primary colors,
   wherein the transparent resin layer has a thickness identical to a difference between the thickness of the color filter layer at each of the color pattern portions of the primary colors and the thickness of the color filter layer at each of the color pattern portions of the complementary colors.

4. A method for manufacturing a color filter substrate for a liquid crystal display device, comprising:
   providing a transparent resin on a transparent insulating substrate, and partially removing the provided transparent resin by a mask exposure to form a transparent resin layer to define color filter pattern portions of three primary colors of red, green, and blue, having the transparent resin layer and color filter pattern portions of complementary colors being removed the transparent resin;
   providing a red coloring agent over the transparent insulating substrate, and partially removing the provided red coloring agent by a mask exposure to form a red color filter layer;
   providing a green coloring agent over the transparent insulating substrate, and partially removing the provided green coloring agent by a mask exposure to form a green color filter layer; and
   providing a blue coloring agent over the transparent insulating substrate, and partially removing the provided blue coloring agent by a mask exposure to form a blue color filter layer,
   wherein each of the color filter layers of red, green, and blue is formed on the color filter pattern portions of primary colors overlapping the transparent resin layer and on the color filter pattern portions of complementary color portions being arranged adjacent to another one of the color filter layers of red, green, and blue, and
   wherein the color filter layer has different thickness at each of the color pattern portions of the three primary colors and at each of the color pattern portions of the complementary colors, respectively.

* * * * *